United States Patent [19]

Saunders

[11] 4,023,823
[45] May 17, 1977

[54] CENTER TOW PIN ASSEMBLY

[75] Inventor: James Warren Saunders, Milpitas, Calif.

[73] Assignee: PACCAR Inc, Bellevue, Wash.

[22] Filed: June 7, 1976

[21] Appl. No.: 693,330

[52] U.S. Cl. .............................. 280/515; 293/69 R
[51] Int. Cl.² ......................................... B60D 1/02
[58] Field of Search .......... 280/504, 515, 408, 480; 59/86; 293/69 R; D12/169; 224/42.03 R, 42.03 A

[56] References Cited

UNITED STATES PATENTS

| | | | |
|---|---|---|---|
| 2,140,132 | 12/1938 | Hollett | 280/515 X |
| 2,660,444 | 11/1953 | Cade et al. | 280/515 |
| 3,774,949 | 11/1973 | Eger | 293/69 |
| D120,209 | 4/1940 | Aché | D12/169 |

Primary Examiner—Joseph F. Peters, Jr.
Assistant Examiner—Michael J. Forman
Attorney, Agent, or Firm—Owen, Wickersham & Erickson

[57] ABSTRACT

A towbar receiving assembly for large trucks, particularly useful for cab-over-engine trucks and other trucks wherein a radiator assembly is positioned directly above a generally flat front bumper, blocking access from above to the space behind the bumper. A towbar pin is inserted from below upwardly into a tow eye box directly behind an opening in the bumper, through which a towbar eye is received and is engaged by the pin. Projecting tabs on the pin and complementarily-shaped slots in a vertical opening associated with the tow eye box provide for receipt of the pin in a particular rotational orientation, and risers or boss areas around the slots provide for the retention of the pin in a locked-in position following its insertion and rotation from the boss areas.

9 Claims, 5 Drawing Figures

CENTER TOW PIN ASSEMBLY

BACKGROUND OF THE INVENTION

The invention relates to towing apparatus for vehicles, and more particularly to a tow pin apparatus for large trucks wherein upper and side access to the space behind the front bumper is blocked.

During their assembly in a manfacturing plant, and later in service, many large trucks often must be towed from one place to another. It is usually not desirable to have a permanently installed tow member. It is, instead, preferred to have a removable tow pin.

Therefore, trucks have often included front towbar receiving assemblies wherein a pin for engagement through the eye of a towbar is inserted from above into a retaining assembly behind the front bumper, with the towbar eye received through an opening in the bumper directly in front of the pin-receiving assembly. Thus, the weight of the pin, which is generally quite large in diameter, is depended upon to retain the pin in place. Often two such pins and receiving assemblies have been provided, for engagement with a towbar having two arms. However, the double towbar pins, each of which was usually associated with one side rail or frame member of the truck, would tend to shift the load from one side rail to the other, often tending to overload a single rail.

In certain trucks access to the space behind the front bumper is blocked from above by a radiator assembly or other apparatus positioned closed to the top of the bumper and in generally flush relationship with the bumper. This is particularly true to certain models of cab-over-engine type trucks. Insertion of the pin horizontally from one side of the pin-retaining assembly is impractical, because it would have to be done blindly by reaching up behind the bumper from below and also because side access may be blocked by structural members retaining the bumper to the frame or by accessories such as fog lamps or parking lights which are often positioned in the front bumper.

One solution to the above problem has been the provision of an outwardly swingable housing in the front bumper of a truck, normally retained behind and flush with the bumper but outwardly swingable to enable a towbar pin to be vertically inserted into the housing from above, through a towbar eye. While this swing-out type apparatus provides a workable towing assembly, its high cost prevents it from being commercially acceptable.

SUMMARY OF THE INVENTION

The present invention provides an efficient solution to the problem of towbar pin emplacement without complex or costly apparatus. The towbar receiving assembly of the invention includes a single central opening in the truck bumper with a fixed tow eye box connected to the inside of the bumper directly behind the opening. Upper and lower plates of the tow eye box have vertically aligned openings for receiving a single generally dowel-shaped towbar pin inserted from below. The upper end of the pin is provided with at least one, and preferably two, radially outwardly extending tabs which in proper orientation of the pin fit through complementarily-shaped slots in the periphery of the upper plate opening. The lower plate opening, which must first receive the upper end of the pin during installation, may also be sized to fit closely over the pin end with slots similar to the upper opening, thereby establishing the proper orientation of the pin as it is passed through the lower opening. On the top of the upper plate is a riser or boss at the location of each slot, so that as the pin tabs pass upwardly through the slots and clear the bosses, the pin may be rotated approximately 90° so that the pin drops down to a locked-in position in which the tabs are resting on the upper plate rotationally spaced from the boss areas. On the bottom end of the towbar pin, a handle may be provided for helping to orient the pin rotationally for installation and also for limiting the upward travel of the pin in the tow eye box, by a radial projection on the handle.

The tow eye box and the central bumper area are preferably both braced to the side rails of the truck frame by a pair of braces, each of which extends from one side of the tow eye box rearwardly at an oblique angle to the bumper to a connection with a side rail. Thus, the centrally positioned tow pin allows the tow load to be equally distributed between the side rails.

Accordingly, it is among the objects of the invention to provide, especially for large trucks which do not allow access to the space behind the front bumper from above, a towbar-receiving assembly wherein the towbar pin is quickly and easily inserted from below the bumper and securely locked in place after installation. This and other objects of the invention will become apparent from the following description taken in conjunction with the accompanying drawings.

DESCRIPTION OF A PREFERRED EMBODIMENT

Figure 1:
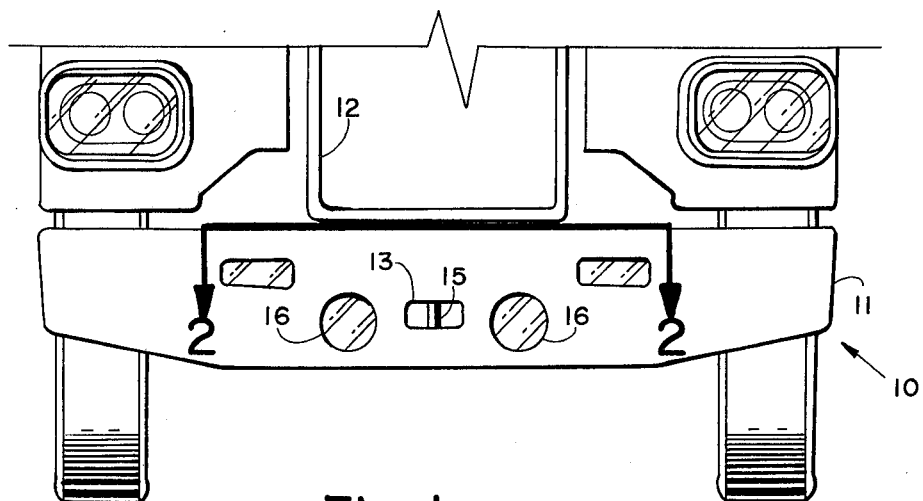
FIG. 1 is a frontal elevational view of a portion of a truck incorporating the towbar receiving assembly of the invention.

In the drawings, FIG. 1 shows a portion of the front of a large truck 10 including a generally flat front bumper 11 extending throughout the width of the truck and a radiator assembly 12 positioned centrally and directly above the bumper 11. The radiator assembly 12 may be approximately flush with the front of the bumper 11, thereby eliminating any access to the space behind the bumper from above. In any event, the apparatus of the invention is particularly useful where some component or portion of the truck is positioned directly above the center of the bumper 11, thereby preventing the insertion of a towbar receiving pin behind the bumper from above.

As also seen in FIG. 1, a central opening 13 is provided through the bumper 11 for receiving the eye end of a towbar (not shown). The opening 13 is wide enough to allow the towbar to pivot somewhat during the towing of the truck 10. Visible in FIG. 1, directly behind the opening 13, is a vertically oriented towbar pin 15, which may be inserted behind the bumper 11 through the eye of the towbar and retained by apparatus to be described below. A pair of fog lamps 16 or other accessories may be positioned on either side of the opening 13 and pin 15, since the apparatus described requires little space behind the bumper 11 and depends only upon access from below the bumper.

Figure 2:
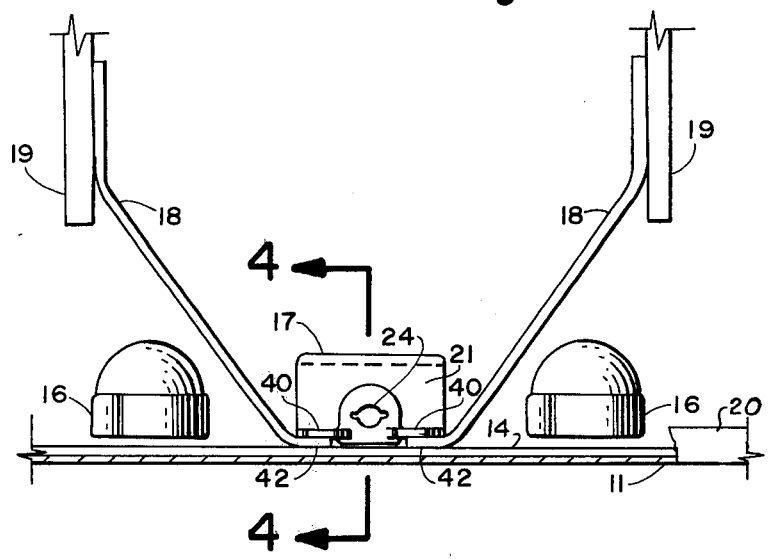
FIG. 2 is a schematic plan view taken along the line 2—2 of FIG. 1.

FIG. 2 schematically indicates the bumper 11, a reinforcing member 14, and portions of the towbar receiving apparatus in plan view. The bumper 11 and its reinforcing member 14, taken together, may be called a bumper assembly. A tow eye box 17 is connected to the back side of the bumper assembly. It may be connected by suitable fasteners to the reinforcing member 14 or to both the member 14 and the bumper 11, directly behind the opening 13. The tow eye box 17 is preferably also connected directly to angularly-extending braces 18 which are affixed at their other ends to side rails 19 of the truck's frame as shown. As indicated, the braces 18 are preferably positioned between the toe eye box and the bumper assembly, and connected to both, although suitable alternative arrangements are possible. The important feature structurally is that the angled braces 18 transmit the towing load from the two eye box 17 generally evenly back to the side rails 19. The connection of the braces 18 with the tow eye box 17, the reinforcing member 14, the bumper 11, and the side rails 19, may be by bolting, welding, or other fastening means (not shown). As indicated in FIGS. 2 and 4, the bumper 11 may be a channel member with upper and lower flanges 20 and 20a.

Figure 4:
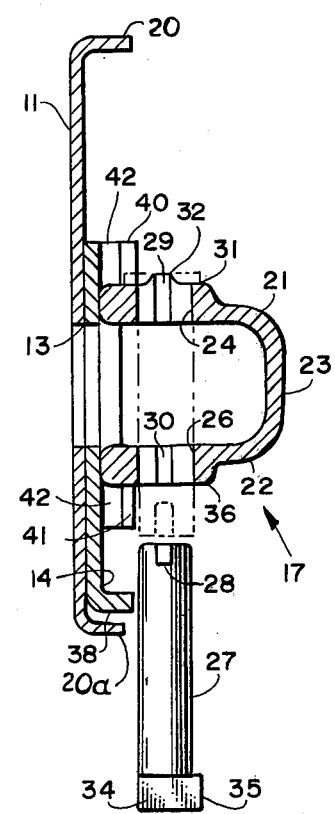
FIG. 4 is a sectional elevational schematic view taken along the line 4—4 of FIG. 2; also showing a towbar pin associated with the towbar receiving apparatus.
Figure 3:
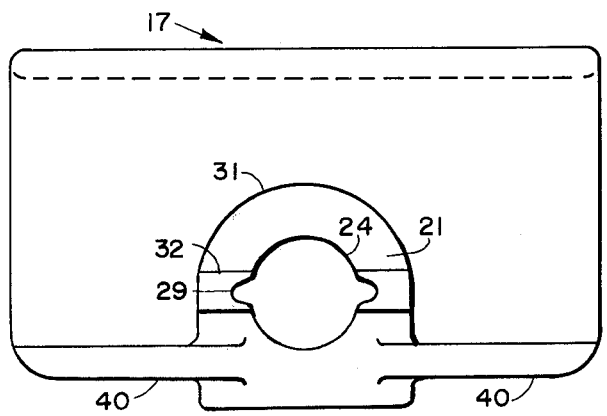
FIG. 3 is an enlarged plan view showing the towbar receiving apparatus indicated in FIG. 2.

As indicated in FIGS. 2, 3, and 4, the tow eye box 17 includes upper and lower plates 21 and 22, with a connecting vertical structural member 23 at its rear side, thereby defining a generally U-shaped structure. The two eye box 17 includes an upper towbar pin receiving opening 24 in the upper plate 21 and a lower opening 26 in the lower plate 22, both openings being generally circular and positioned on a vertical line centrally behind the bumper opening 13.

Figure 5:
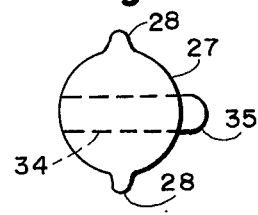
FIG. 5 is a plan view of the towbar pin.

As shown in FIGS. 4 and 5, a towbar pin 27, generally dowel-shaped and slightly smaller in diameter than the upper and lower plate openings 24 and 26, is adapted to be inserted upwardly through first the opening 26 and than the opening 24. This assembly is performed when the towbar eye (not shown) is positioned through the bumper opening 13 and in the path of the pin 27 between the upper and lower plate openings 24 and 26. The towbar pin 27 includes preferably two radially projecting tabs 28 at its upper end for rotationally oriented passage through complementarily-shaped slots 29 and 30 extending outwardly from the upper and lower plate openings 24 and 26, respectively.

As indicated, particularly in FIGS. 3 and 4, the upper plate 21 includes a riser or boss 32 on the periphery of the opening 24 at the location of each slot 29, residing in a central thickened portion 31 of the upper plate which protrudes forwardly as shown in FIGS. 3 and 4. These risers 32 may be relatively sharp-shouldered but curved as they descend into the surface of the thickened portion 31. When the pin 27 is moved upwardly to the extent that the tabs 28 clear the risers 32, the pin is rotated so that it descends somewhat as the tabs 28 settle onto the thickened portion 31 between the risers 32, as shown in dashed lines in FIG. 4.

The towbar pin 28 also preferably includes a handle 34 at its lower end, serving a number of purposes. It forms a grip for an operator, serves to indicate the proper orientation of the pin for its insertion into the tow eye box 17, and also serves as a stop to prevent movement of the pin all the way through the lower plate opening 26, by the provision of a radial projection 35 on the handle which is larger than the slots 30 and 29. The length of the pin from the bottom of the tabs 28 to the top of the radial projection 35 is just slightly greater than the distance between the top surface of the risers 32 and the bottom surface of a thickened portion 36 surrounding the lower plate opening 26. Thus, as the pin 27 is inserted as far as possible upwardly into the tow eye box 17, it just clears the risers 32, enabling it to be rotated into a locked position.

As shown in FIG. 4, the reinforcing member 14 is adjacent to the opening 13, which extends through both the bumper 11 and the reinforcing plate 14. This member 14 may include a protruding flange 38 at its bottom above the bumper flange 20a and extending close to the path of the dowel pin 27 as shown in FIG. 4, so that the pin may only be oriented as shown in FIG. 4 when it is inserted. A 180°-opposite rotation would result in interference between the radial projection 35 of the handle 34 and the flange 38 of the reinforcing member 14. The inserted pin 27 may then be rotated approximately 90° in either direction but the operator will know upon removing the pin that it must be rotated (while lifted) to a position with the handle projection 35 oriented rearwardly. This serves to aid the operator, who would ordinarily remove the pin by reaching under the front bumper 11 witout being able to see the top or bottom of the pin 27.

Although the preferred form of the pin 27 and the cooperating tow eye box openings 24 and 26 is as shown in the drawings and described above, it should be understood that the importance of this structure lies in the complementary shapes and sizes of the upper opening 24 and the upper end of the pin 27. The lower opening 26 may omit slots but simply be large enough to receive the pin with its protruding tabs. To establish a snug fit at the lower opening and limit horizontal movement of the pin bottom, the pin may include an enlarged-diameter portion (not shown) near its lower end.

As illustrated in FIGS. 2, 3, and 4, the thickened portions 31 and 36 associated with the upper and lower plates 21 and 22 of the tow eye box preferably extend forward somewhat from upper and lower pairs of mounting flanges 40 and 41. The reason for this structure is to provide a space for connecting ends 42 of the angularly extending braces 18 which connect with the side rails 19 to the rear. This provides for the preferred manner of connection wherein the brace ends 42 are sandwiched between the mounting flanges of the tow eye box 17 and the reinforcing member 14 of the bumper 11. Thus, a strong, solid connection is made among the tow eye box 17, the braces 18, and the bumper assembly, including the strengthening member 14, with the extending thickened areas 31 and 36 not quite contacting the reinforcing member 14.

The above-described preferred embodiment provides apparatus for easily, efficiently, and securely installing a towbar pin behind the front bumper of a large truck from below, avoiding the need for access from above and without interfering with the bumper structure or accessories and without requiring costly swing-out type devices. Various other embodiments and alterations to this preferred embodiment will be apparent to those skilled in the art and may be made without departing from the spirit and scope of the following claims.

I claim:

1. A towbar receiving assembly for a truck having a frame and having a generally flat front bumper assembly connected to the frame, upper access to the space behind the bumper assembly being blocked by apparatus above the bumper assembly, comprising:

a tow eye box connected to the back side of the bumper assembly adjacent to an opening through the bumper assembly, said tow eye box including an upper and a lower plate defining upper and lower vertical pin-receiving openings positioned generally on a vertical line directly behind the bumper assembly opening, at least the upper of said openings being generally circular with at least one radially outwardly extending slot, and a generally dowel-shaped towbar pin having at least one radially outwardly projecting tab at its upper end and a handle at its lower end, said pin being sized to be received upwardly through the pin-receiving openings of the tow eye box, with close tolerance at the upper opening and with the tab aligned with the slot as the pin enters the upper opening, said tow eye box also including means for locking the towbar pin in a position with the tab rotationally spaced from the slot when the pin is pushed through the upper opening and rotated.

2. The towbar receiving assembly of claim 1 wherein a pair of angled braces connect the bumper assembly to the truck frame, each brace being connected at least to the bumper assembly adjacent to the tow eye box and extending rearwardly, diverging from the other brace at an angle oblique to the length of the bumper assembly, to a connection with the truck frame.

3. The towbar receiving assembly of claim 2 wherein the bumper assembly includes a foward bumper component and a reinforcing plate member connected to the rear side thereof, said angled braces being positioned between and connected to the reinforcing plate member and the toe eye box.

4. The towbar receiving assembly of claim 1 wherein the handle of the towbar pin includes means for indicating to an operator the proper rotational orientation of the pin as it is inserted upwardly into the tow eye box.

5. The towbar receiving assembly of claim 1 which further includes means associated with the towbar pin handle and the lower plate for limiting the upward travel of the towbar pin in the tow eye box.

6. The towbar receiving assembly of claim 1 wherein said locking means comprises a boss at the location of the slot in the upper plate of the tow eye box, whereby, when the pin is inserted upwardly into the tow eye box to a point where the pin tab clears the boss, the pin may be rotated to allow it to fall into position with the tab beside the boss.

7. The towbar receiving assembly of claim 6 wherein a pair of said slots are provided in the upper plate extending from its opening opposite one another, with a pair of said bosses provided, and wherein the towbar pin includes an opposed pair of said tabs in complementary configuration to the slots.

8. The towbar receiving assembly of claim 1 wherein a pair of said slots are provided in the upper plate extending from its opening opposite one another, and wherein the towbar pin includes an opposed pair of said tabs in complementary configuration to the slots.

9. The towbar receiving assembly of claim 1 wherein the lower plate opening is sized slightly larger than the upper end of the towbar pin and is provided with a slot directly below the upper opening slot for receiving the towbar pin in proper rotational orientation for its passage through the upper opening.

* * * * *

UNITED STATES PATENT AND TRADEMARK OFFICE
CERTIFICATE OF CORRECTION

PATENT NO. : 4,023,823
DATED : May 17, 1977
INVENTOR(S) : James Warren Saunders

It is certified that error appears in the above-identified patent and that said Letters Patent are hereby corrected as shown below:

Column 1, line 30, "closed to" should read --close to--.

Column 1, line 32, "true to" should read --true of--.

Column 3, line 20, "two eye box" should read --tow eye box--.

Column 3, line 31, "two eye box" should read --tow eye box--.

Column 3, line 40, "than" should read --then--.

Column 4, line 25, "witout" should read --without--.

Column 5, line 23, which is the next to the last line of claim 1, after "pushed" insert --upwardly--.

Signed and Sealed this

Sixth Day of September 1977

[SEAL]

Attest:

RUTH C. MASON
Attesting Officer

LUTRELLE F. PARKER
Acting Commissioner of Patents and Trademarks